(12) United States Patent
Uozumi et al.

(10) Patent No.: US 8,420,009 B2
(45) Date of Patent: Apr. 16, 2013

(54) GAS CUPOLA FOR MELTING METAL

(75) Inventors: Minoru Uozumi, Toyota (JP); Kaisei Tai, Toyota (JP)

(73) Assignee: Aisin Takaoka Co., Ltd., Aichi-ken (JP)

( * ) Notice: Subject to any disclaimer, the term of this patent is extended or adjusted under 35 U.S.C. 154(b) by 214 days.

(21) Appl. No.: 12/937,125

(22) PCT Filed: May 19, 2009

(86) PCT No.: PCT/JP2009/059191
§ 371 (c)(1),
(2), (4) Date: Oct. 8, 2010

(87) PCT Pub. No.: WO2009/145084
PCT Pub. Date: Dec. 3, 2009

(65) Prior Publication Data
US 2011/0031661 A1    Feb. 10, 2011

(30) Foreign Application Priority Data
May 30, 2008    (JP) ................. 2008-142620

(51) Int. Cl.
*C22B 7/00*    (2006.01)
(52) U.S. Cl.
USPC .......................... 266/242; 266/900
(58) Field of Classification Search .......... 266/242, 266/216, 236, 900
See application file for complete search history.

(56) References Cited

U.S. PATENT DOCUMENTS

| | | | |
|---|---|---|---|
| 4,311,519 A * | 1/1982 | Berry | 266/900 |
| 4,844,426 A * | 7/1989 | Barnes et al. | 266/236 |

FOREIGN PATENT DOCUMENTS

| | | |
|---|---|---|
| CN | 1046596 | 10/1990 |
| CN | 2411454 | 12/2000 |
| DE | 3106859 | 9/1982 |

(Continued)

OTHER PUBLICATIONS

Notification of Reasons for Refusal issued by the Japan Patent Office on May 10, 2012.
Zhao Zhan-Liang, "Injecting Oxygen into Cupola Hearth to Increase Temperature of Molten Iron," Modern Cast Iron, Dec. 2003, pp. 29-31, Issue 6.
Office Action issued by the Chinese Intellectual Property Office on Oct. 29, 2012.

*Primary Examiner* — Scott Kastler
(74) *Attorney, Agent, or Firm* — IP & T Group LLP

(57) ABSTRACT

It is an object to provide a gas cupola for melting a charging material efficiently by a combustion flame of a combustion burner. The gas cupola includes a furnace body having a melting chamber 10 and a molten metal discharge port 11 for discharging the molten metal and a plurality of combustion burners 4 forming a combustion flame 41. The combustion burner 4 melts the charging material 2 in the melting chamber 10 by ejecting the combustion flame 41 to the charging material 2 in the melting chamber 10. Each combustion burner 4 generates a hollow shaped melting portion 42 at the charging material 2 of the melting chamber 10 by the combustion flame 41 ejected from each combustion burner 4. In the cross sectional view of the furnace body 1 taken along a horizontal direction, the combustion burners 4 are arranged so that the adjacently positioned two hollow shaped melting portions 42 overlap with each other. When the charging material 2 is melting, each hollow shaped melting portion 42 communicates with the molten metal discharge port 11.

3 Claims, 7 Drawing Sheets

FOREIGN PATENT DOCUMENTS

| | | |
|---|---|---|
| JP | 52-008908 | 1/1977 |
| JP | 52-126603 | 10/1977 |
| JP | 56-53372 | 5/1981 |
| JP | 03-241286 | 10/1991 |
| JP | 10-219367 | 8/1998 |
| JP | 2000-274958 | 10/2000 |
| JP | 2001-342509 | 12/2001 |
| JP | 2007-064498 | 3/2007 |

\* cited by examiner

GAS CUPOLA FOR MELTING METAL

This application is a national stage application of PCT/JP2009/059191 filed on May 19, 2009, which claims priority of Japanese patent application number 2008-142620 filed on May 30, 2008. The disclosure of each of the foregoing applications is incorporated herein by reference in its entirety.

TECHNICAL FIELD

This invention relates to a gas cupola for manufacturing molten metal, such as for example, casting iron molten metal, etc.

BACKGROUND OF THE TECHNOLOGY

Conventionally, a coke cupola for melting a charging material such as pig iron by the heat of the coke has been known. Further, in view of effective use of resources, recently, a gas cupola for melting metal equipped with a combustion burner has been known, by which the combustion flame for melting a charging material is formed. Still further, another gas cupola for melting metal using combination of the combustion flame formed by the combustion burner and the coke. (See Patent document 1). Further, a furnace for melting metal equipped with a combustion burner in the melting chamber of the furnace body is known. (See Patent document 2).
Patent Document 1: JP 57(1982)-27382
Patent Document 2: JP 2000-274958 A

DISCLOSURE OF INVENTION

Problems to be Solved

Melting capacity for the combustion flame is not sufficient for the gas cupola for melting the charging material by the combustion flame formed by the combustion burner described above. Due to this reason, this type has reached to the limit of efficient and prompt melting of the charging material. As to the type of gas cupola using combination of combustion flame by combustion burner and the heat by coke for melting the charging material, although the melting capacity of the combustion flame can be improved by using the coke, but a large amount of cokes is needed in addition to the fuel for combustion by the combustion burner.

This invention was made considering the above conventional problems and the object of the invention is to provide a gas cupola for melting metal that can effectively melt the charging material by the combustion flame formed by the combustion burner.

Means for Solving the Problem

The gas cupola for melting metal according to the invention includes (i) a furnace body having a melting chamber for melting a metal based charging material and a molten metal discharge port for discharging molten metal formed by the charging material melted in the melting chamber and a plurality of combustion burners provided in the furnace body for forming combustion flame by burning fuel and ejecting the combustion flame to the charging material in the melting chamber for melting the charging material, wherein (ii) in a cross sectional view of the furnace body taken along the horizontal direction, each of the plurality of combustion burners forms a hollow shaped, hollow melting portion to the charging material in the melting chamber by the combustion flame ejected from each combustion burner and the plurality of combustion burners is arranged in a circumferential direction but not in a full circle, centering on the center line of the melting chamber so that the plurality of hollow melting portions is overlapped with each of adjacently arranged hollow melting portions along a circumferential direction centering on the center line of the melting chamber, characterized in that said each of the hollow melting portions establishes communication with the molten metal discharge port upon melting of the charging material.

The combustion burners form combustion flames ejected from each combustion burner and form the hollow shaped, hollow melting portions at the charging material charged into the melting chamber by the combustion flame. The plurality of combustion burners is arranged so that the each hollow melting portion is overlapped with at least a portion of the adjacently positioned hollow melting portion upon melting of the charging material. As the result, during the melting process of the charging material, the adjacently positioned two hollow melting portions are in communication with each other. Accordingly, each hollow melting portion can establish communication with the molten metal discharge port. Thus, the melted charging material (molten metal) flows easily towards the molten metal discharge port so that the charging material can be efficiently melted. The charging material is a metal based material. As the metal therefor, iron group (such as cast iron, cast steel, stainless steel or steel alloy) can be exampled. As the charging material, scraps, such as waste material and pig iron ingot are the representative materials and additives such as ferrosilicon or ferromanganese may be used.

Several aspects below according to the invention may be considered.

Among the plurality of combustion burners, each adjacently positioned combustion burner has to be arranged so that the each of the hollow melting portions formed by the combustion flame of each combustion burner is overlapped with each other during the melting process of the charging material. In other words, it is necessary for the combustion burners to be arranged so that at least a portion of each of the hollow melting portions formed by the combustion flames of each combustion burner overlaps with each other to form an overlapping portion. As the result, each hollow melting portion can establish communication with the molten metal discharge port upon melting of the charging material. In other words, one of the hollow melting portions communicates with the molten metal discharge port through another one of the hollow melting portions. Thus, due to the establishment of such communication, the charging material (molten metal) melted at the one of the hollow melting portions flows easily towards the molten metal discharge port and the retention or remaining of the molten metal in the melting chamber can be prevented. Accordingly, the charging material can be efficiently melted to increase the melting speed.

It is preferable for the cupola to have an exhaust gas passage for discharging the combustion gas in the melting chamber by establishing a communication between the melting chamber of the furnace body and the outside air, an open/close door for opening and closing the exhaust gas passage and a driving portion for driving the open/close door in an opening/closing direction. In this structure, if the open/close door is closed or the door opening amount is set to be small, the sealability and the closability of the melting chamber can be enhanced to capture the combustion gas for forming combustion flame (the combustion gas after oxidized and combusted by oxygen used as fuel). This will easily make the melting chamber maintain to be in a weak oxidization environment or even in a non-oxidization environment. Further, since the entering of a strong oxidative outside air can be suppressed, the melting chamber can be easily maintained to be in a weak oxidative environment or even a non-oxidization environment. Further, when the furnace pressure in the melting chamber excessively increases, the furnace pressure in the melting chamber can be adjusted to be reduced by just opening the open/close door.

Accordingly, it is preferable to provide an exhaust gas passage for discharging the combustion gas in the melting chamber by establishing a communication between the melting chamber of the furnace body and the outside air, an open/close door for opening and closing the exhaust gas passage and a driving portion for driving the open/close door in an opening/closing direction. As the open/close door, either rotational type or direct acting type may be used. The furnace body may have, for example, a non-circular shape viewed in a cross section taken along a horizontal direction.

The "non-circular" means any shape except the true circle and squamocolumnar, oval or trapezoid shape in cross section may be exampled.

It is preferable to arrange a carburization device at the molten metal discharge port side for carburizing and increasing temperature of the molten metal discharged from the molten metal discharge port. This will enable the communication between an exhaust gas port of carburization device and the melting chamber. It is preferable to arrange an injection device for supplying oxygen or air into the melting chamber to adjust the component ratio of the molten metal. Thus, the component adjustment of the molten metal can be carried out.

It is preferable for a gas cupola to be provided with a furnace floor surface at the bottom of the melting chamber and the furnace floor surface is preferably provided to be inclined downwardly towards the melting metal discharge port. The inclination thereof can be appropriately set. According to the case of providing the inclination for the furnace floor surface, the melted molten metal is discharged from the molten metal discharge port downwardly along the furnace floor surface. This can increase the discharge speed of the molten metal discharged from the molten metal discharge port. Accordingly, the retention of the molten metal in the melting chamber can be restrained. Accordingly, the charging material can be efficiently melted. Further, the consumption of the alloy element contained in the molten metal can be restrained.

The Advantages and Effects of the Invention

According to the invention, the combustion burners are arranged so that the plurality of hollow shaped melting portions are overlapped with each adjacently positioned hollow shaped melting portion and each of the hollow shaped melting portions is in communication with the molten metal discharge port. Accordingly, the discharge material (molten metal) melted at the hollow shaped melting portion easily flows towards the molten metal discharge port through another hollow shaped melting portion to prevent the molten metal from remaining in the furnace body. Thus the charging material can be efficiently melted. This can reduce the use of coke or even abolish the use thereof.

BRIEF EXPLANATION OF ATTACHED DRAWINGS

EXPLANATION OF NUMERALS IN THE ATTACHED DRAWINGS

Figure 1:
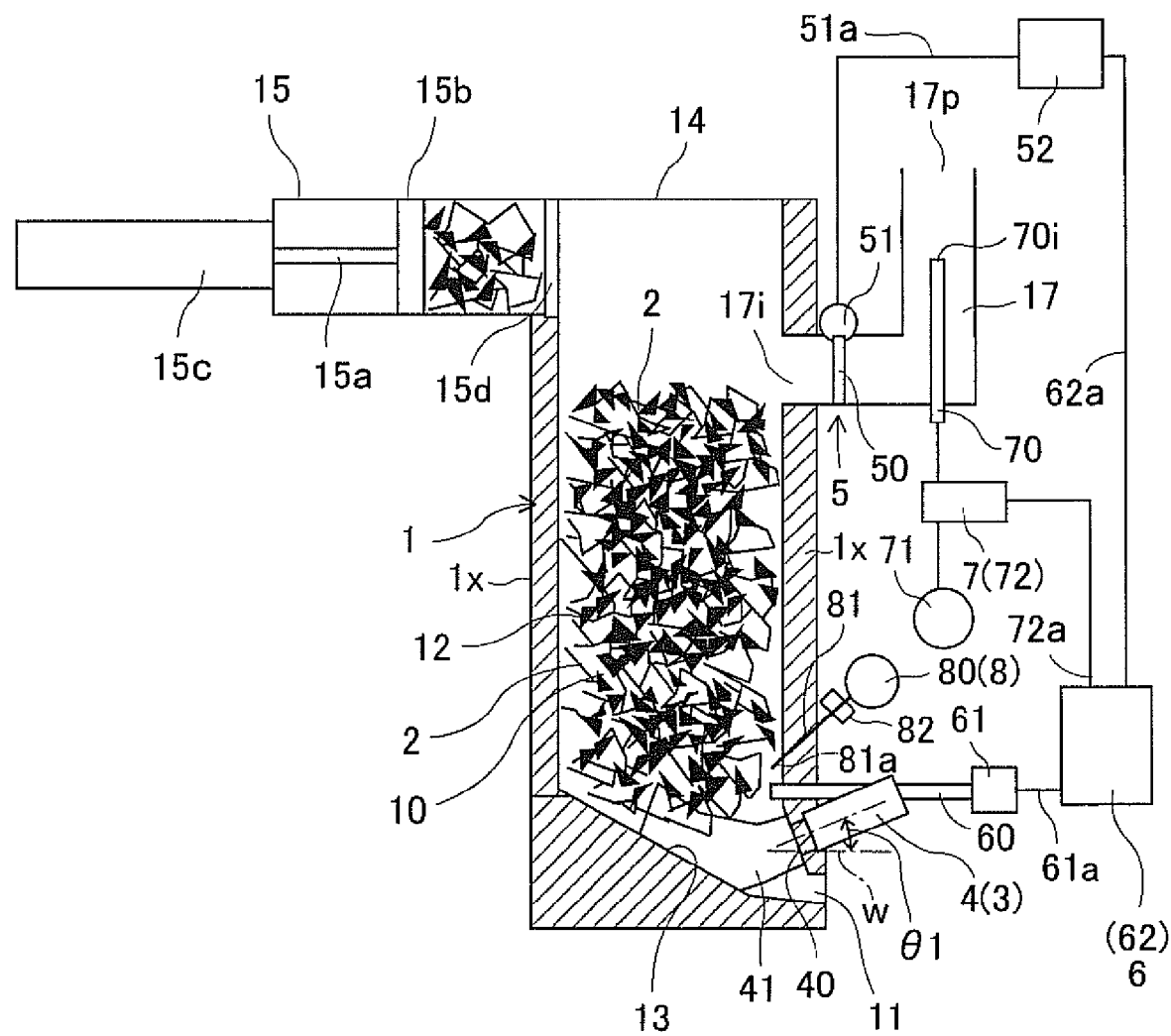
FIG. 1 is a view showing the structure of the gas cupola with the surrounding equipments according to a first embodiment of the invention.

Numeral 1 designates a furnace body, numeral 10 designates a melting chamber, numeral 11 designates a molten metal discharge port, numeral 12 designates preheating zone, numeral 13 designates a furnace floor surface, numeral 17 designates an exhaust gas passage, numeral 19 designates a cooling passage, numeral 2 designates a charging material, numeral 3 designates a group of combustion burners, numeral 4 designates a combustion burner, numeral 41 designates a combustion flame, numeral 42 designates a hollow shaped melting portion, numeral 44 designates an overlapping portion, numeral 5 designates an open/close door mechanism, numeral 50 designates an open/close door, numeral 51 designates a driving portion, numeral 52 designates a door control portion, numeral 6 designates a furnace pressure control device, numeral 60 designates a pressure guiding pipe, numeral 61 designates a furnace pressure meter, numeral 8 designates an oxygen injecting device, numeral 9 designates a carburization device, numeral 90 designates a packed bed, numeral 92 designates a molten metal inlet port, numeral 93 designates a molten metal outlet port and numeral 96 designates an exhaust gas port.

THE BEST MODE EMBODIMENTS OF THE INVENTION

First Embodiment

As shown in FIG. 1, the gas cupola for melting metal according to the embodiment of the invention is used for forming a molten metal from a cast iron and includes a cylindrical furnace body 1 and a group 3 of combustion burners. As a cast iron, flake graphite cast iron, spherical graphite cast iron, vermicular graphite cast iron, etc. are exampled. The furnace body 1 is a vertical type furnace extending vertically in the direction of gravitational force and includes a melting chamber 10 for melting a metal based charging material 2 and a molten metal discharge port 11 for discharging the molten metal melted in the melting chamber 10. Upper side of the melting chamber 10 is used as a pre-heating zone 12 for pre-heating the charging material 2. The molten metal discharge port 11 is provided in the vicinity of a bottom portion of the furnace body 1. Bottom side of the melting chamber 10 is provided with a furnace floor surface 13 inclined downwardly towards the molten metal discharge port 11. It is preferable to provide the molten metal discharge port 11 at the bottommost portion of the furnace floor surface 13. An airtight cover 14 is provided at the upper portion of the melting chamber 10 for opening and closing the upper portion of the melting chamber 10. A charging portion 15 is provided at an upper portion of the melting chamber 10 for pouring the charging material 2 into the melting chamber 10. The charging portion 15 includes a charging pusher 15a having a charging hopper 15b, capable of advancing and retreating movement, a driving source 15c (hydraulic pressure cylinder) for advancing and retreating the charging pusher 15a and a airtight open/close door 15d for enhancing the air interruption performance between the melting chamber 10 and the outdoor air.

When charging the charging material 2 into the melting chamber 10, the air-tight open/close door 15d is opened. The charging material 2 is formed by at least one kind from the metal based scrap, pig iron and ingot. Alloy additives, such as ferrosilicon or ferromanganese or the like, may be properly mixed. As the scrap and pig iron ingot, the iron group (such as cast iron, cast steel, stainless steel or alloy steel) can be exampled. In general, the charging material 2 is charged up to around the furnace top portion of the melting chamber 10, but not limited to this method. Further, it is preferable not to charge the combustible carbonaceous material, such as graphite into the melting chamber 10 from the charging portion 15. Using the gas cupola, the charging material 2 is melted within a very short period of time (for example, within several minutes) immediately after the charging material 2 has been charged into the melting chamber 10.

The group of combustion burners 3 formed by a plurality of (in the example shown in FIG. 2, three) combustion burners 4 (Refer to FIG. 2) is provided. Each combustion burner 4 is supplied with a gaseous or liquid fuel and oxygen. In other words, the combustion burner is a combustor forming a combustion flame 41 by oxidized combustion of fuel within a predetermined oxygen ratio. Oxygen ratio is defined by a mass ratio of oxygen amount relative to the combusted oxygen amount (equivalent). The temperature of combustion flame 41 is set to about 1700° C. to 3500° C. or 2000° C. to 3200° C. Thus, according to the gas cupola, the melting temperature to melt the charging material 2 can be kept high. Since the temperature of combustion flame 41 of the combustion burner 4 is high, the metal material, such as scrap, the melting temperature of which is higher than that of pig iron, can be easily melted. Although the temperature of the combustion flame 41 of the combustion burner 4 is high, the heat capacity of the combustion flame 41 formed by the combustion burner 4 is low and accordingly, the combustion flame 41 has the characteristic that the heat transfer to the charging material 2 is good but that the temperature of the combustion flame 41 itself easily drops.

As shown in FIG. 1, the combustion burner 4 is provided with a downward inclination angle θ1 relative to an imaginary horizontal line W so that a combustion flame outlet 40 of the combustion burner 4 faces downward relative to the imaginary horizontal line W. The value of the angle θ1 is predetermined to be, for example, between 10° and 50°, or between 15° and 45°. The combustion flame outlet 40 of the combustion burner 4 approaches the furnace floor surface 13 formed by a refractory material and opposes the furnace floor surface 13. The combustion flame 41 ejected from the combustion flame outlet 40 of the combustion burner 4 contacts the furnace floor surface 13. Accordingly, the combustion burner 4 ejects the combustion flame 41 towards the charging material 2 in the melting chamber 10 and melts the charging material 2 in the melting chamber 10. The fact that the combustion flame 41 is formed and ejected from the combustion flame outlet 40 means that the fuel supplied to the combustion burner 4 is oxidized and combusted by the oxygen. And then, the combustion gas after oxidization and combustion remains in the melting chamber 10. At the combustion burner 4, combustion is carried out using oxygen with substantially nitrogen free and not using the air containing nitrogen and oxygen and accordingly, although the combustion gas remains in the melting chamber 10, the remaining of a large amount of nitrogen gas is restricted. Accordingly, there is no need to heat up nitrogen gas which is included in the air and does not contribute to the combustion in the melting chamber 10. This will improve the heat efficiency of the cupola.

Further, an exhaust gas passage 17 is provided at an upper portion of the furnace body 1 for exposing the melting chamber 10 of the furnace body 1 to the outside air. The exhaust gas passage 17 discharges the combustion gas in the melting chamber 10 to the outside of the furnace body 1. An inlet port 17i of the exhaust gas passage 17 faces the inside of the melting chamber 10 and an outlet port 17p faces the outside. An open/close door mechanism 5 is provided for opening and closing the inlet 17i side of the exhaust gas passage 17. The open/close door mechanism 5 includes an open/close door 50 provided at the inlet 17i side of the exhaust gas passage 17 for opening and closing the exhaust gas passage 17, a driving portion 51 for driving the open/close door 50 in open/close direction and a door control portion 52 for controlling the driving portion 51 via a signal line 51a. The driving portion 51 can be formed by a motor mechanism.

A furnace pressure control device 6 includes a pressure guiding pipe 60 for detecting the pressure of the melting chamber 10 in the vicinity of the combustion burners 4, a furnace pressure meter 61 receiving the furnace pressure in the melting chamber 10 via the pressure guiding pipe 60 and a control portion 62 to which a furnace pressure signal from the furnace pressure meter 61 is inputted through a signal line 61a. The control portion 62 controls the door control portion 52 via a signal line 62a and consequently the control portion 62 controls the open/close door 50. In this case, if the open/close door 50 is closed or the amount of opening degree of the open/close door 50 is small, the air-tightness and closability of the melting chamber 10 can be improved. In this case, it is preferable to set the furnace pressure value to be higher than the atmospheric pressure. Then the outside air including the oxygen is prevented from entering into the melting chamber 10 to prevent consumption of the charging material 2 in the melting chamber 10 by oxidization. In order to increase the furnace pressure in the melting chamber 10, the opening amount of the open/close door 50 is set to be smaller.

According to the embodiment of the invention, since the closability of the melting chamber 10 is high, the combustion gas (combustion gas after the fuel being oxidized and combusted) generated by the combustion of the combustion flame 41 of the combustion burners 4 can be raised and accumulated in the melting chamber 10. Accordingly, the melting chamber 10 can be easily kept to be in a weak oxidized environment or non-oxidized environment. Further, as long as the open/close door 50 is closed or the degree of opening of the open/close door 50 is kept to be small, a strong oxidization force from outside is prevented from entering into the melting chamber 10. Thus, the melting chamber 10 can be easily kept to be in a weak oxidization force environment or non-oxidized environment. Thus, the consumption of the charging material 2 by oxidization can be prevented.

During operation, the melting chamber 10 is basically closed. Substantially no opening except the molten metal discharge port 11 exists or very few exist. Accordingly, the outside air can enter from this molten metal discharge port 11 and melted molten metal may be oxidized thereby. Particularly, the melting portions prevail around the molten metal discharge port 11 and accordingly, the molten metal melted at the melting portion might be oxidized. Therefore, an excess entering of the large amount of outside air into the melting chamber 10 from the molten metal discharge port 11 can be prevented by measuring the furnace pressure in the melting chamber 10 by the furnace pressure meter 61 via the pressure guiding pipe 60 and controlling the furnace pressure in the melting chamber 10 to be larger than the atmospheric pressure, although some ambient pressure in the furnace may flow out of the furnace to the outside via the molten metal discharge port 11. However, it is preferable to prevent excess ambient pressure in the furnace from flowing out to be exposed to the outside air via the molten metal discharge port by controlling the furnace pressure in the melting chamber 10. Accordingly, it is also preferable to prevent an excess increase of the furnace pressure in the melting chamber 10. It should be noted here that the charging material 2 charged in the melting chamber 10 at the upper side thereof is pre-heated by the exhaust heat of the combustion gas.

Further, upon melting of the charging material 2, when the furnace pressure in the melting chamber 10 increases excessively, the furnace pressure control device 6 detects the excess increase and opens the open/close door 50. This can decrease and adjust the furnace pressure in the melting chamber 10. Upon melting, the high temperature combustion flame 41 and the charging material 2 are in direct contact and heat transfer is carried out. This can reduce the contact area between the high temperature combustion flame 41 and the furnace body 1 and is advantageous for preventing any heat damages which may occur on a wall 1x of the furnace body 1. The material which can be melted is charged in the melting furnace as the charging material 2, however, the material such as carbon, which is combusted without melting, is not charged in the melting furnace as the charging material 2. By charging the charging material 2 in the melting chamber 10 timely, the continuous melting in the melting chamber 10 can be possible.

A suction device 7 is provided for assisting the discharging operation of the combustion gas in the melting chamber 10 to the outside. The suction device 7 includes an ejector (gas ejecting tool) 70 provided in the exhaust gas passage 17 for ejecting the gas, a high pressure tank 71 for reserving a high pressure gas (for example, inert gas, such as air, nitrogen or argon gas) and a flow rate modulating valve 72 provided between the high pressure tank 71 and the ejector 70. The furnace pressure control device 6 controls the opening degree of the flow rate modulating valve 72 via a signal line 72a. The flow rate of high pressure gas (for example, inert gas, such as air, nitrogen or argon gas) reserved in the high pressure tank 71 is first modulated by the flow rate modulating valve 72 and then the high pressure gas is supplied to the ejector 70. The gas ejected from a nozzle 70i of the ejector 70 is ejected to the outside and at the same time the combustion gas remained within the exhaust gas passage 17 is also moved together with the combustion gas and discharged outside. Thus the ejector 70 can assist the furnace pressure adjustment in the melting chamber 10.

Figure 2:
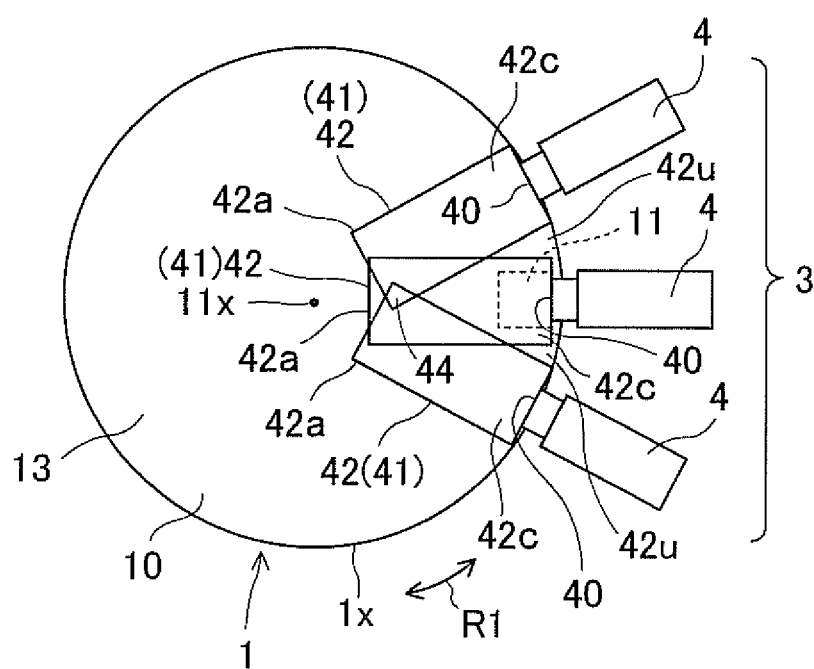
FIG. 2 is a cross sectional view taken along a horizontal direction and showing schematically the gas cupola according to the first embodiment of the invention.

FIG. 2 shows a diagram of cross sectional view of the furnace body 1 taken along a horizontal direction. As shown in FIG. 2, the group 3 of combustion burners formed by a plurality of combustion burners 4 is positioned at the molten metal discharge port 11 side eccentrically located relative to the center line 11x of the furnace body 1. The burners 4 are arranged at the molten metal discharge port 11 side and not provided at the opposite side of the molten metal discharge port 11. Accordingly, the plurality of combustion burners 4 are arranged in a circumferential direction of the furnace body 1 centering on the center line 11x, but not arranged in full circle. The combustion flame 41 ejected from each of the combustion burners 4 forms a hollow shaped, hollow melting portion 42 formed in the shape of cylinder or similar to cylindrical shape to the charging material 2 in the melting chamber 10.

FIG. 2 also shows a diagram of plurality of hollow melting portions 42. Each combustion burner 4 arranged adjacently with each other in a circumferential direction about the center line 11x is arranged to form an overlapping portion 44 by the adjacently positioned two hollow melting portions 42. Particularly, the plurality of the combustion burners 4 is arranged so that each tip end portion 42a (a portion of the hollow melting portion 42) of the adjacently positioned hollow melting portions 42 formed by the combustion flame 41 ejected from the combustion burner 4 form the overlapping portion 44 (corresponding to the melting portion of the melted charging material 2) by overlapping the adjacently positioned two hollow melting portions 42. In other words, each adjacently positioned hollow melting portion 42 overlaps in a circumferential direction (in an arrow R1 direction in FIG. 2) centering on the center line 11x and establishes communication with each other in the circumferential direction. It is noted that at least one of the plurality of hollow melting portions 42 communicates with the molten metal discharge port 11. Accordingly, upon melting of the charging material 22, one of the hollow melting portions 42 communicates with the molten metal discharge port 11 through another of the hollow melting portions 42. Or, one of the hollow melting portions 42 communicates with the molten metal discharge port 11 directly. Accordingly, the charging material 2 (molten metal) melted by any one of the hollow melting portions 42 among the plurality of the hollow melting portions 42 flows easily towards the molten metal discharge port 11 and is quickly discharged from the molten metal discharge port 11. Thus the remaining of the molten metal melted in the melting chamber 10 can be prevented. This can eventually achieve an efficient melting of the charging material 2. Particularly, since the furnace floor surface 13 is inclined downwardly towards the molten metal discharge port 11, the molten metal flows easily towards the molten metal discharge port 11. Because of this structure, the remaining of the molten metal melted in the melting chamber 10 can be further prevented and this will contribute to the increase of the melting speed. Thus, the use of coke can be eliminated or a large amount use of coke can be prevented. Further, since the remaining of the molten metal is prevented and the molten metal can be discharged quickly, the consumption of alloy elements contained in the molten metal can be reduced.

When assuming that the hollow volume Va of one hollow melting portion 42 formed by the combustion flame 41 of one combustion burner 4 is 100%, it is preferable to form an overlapping portion 44 with the volume ratio of 10% to 90%, particularly 30% to 80% being overlapped. It is noted that the overlapping portion 44 is positioned deviating from the molten metal discharge port 11 side with respect to the center line 11x of the furnace body 1. The temperature of the overlapping portion 44 is considered to be in a high temperature zone, for example, of about 1800° C. to 3300° C., or 2000° C. to 3200° C. or particularly, 2500° C. to 3000° C. Accordingly, the charging material 2 in the overlapping portion 44 is quickly melted within a short period of time. Further, the overlapping portion 44 is positioned near the furnace floor surface 13 and accordingly, the molten metal promptly flows downward along the inclined furnace floor surface 13 and is ejected from the molten metal discharge port. Although not shown in the drawings, an auxiliary combustion burner may be provided near the molten metal discharge port 11 for the purpose of auxiliary functioning.

As shown in FIG. 2, each base end portion 42c of the adjacently positioned hollow melting portions 42 in the circumferential direction is basically not overlapped with each other and forms non-overlapping portion 42u at each hollow melting portion 42. Even overlapped, the overlapping level is set to be low. As the result, the heat damages to the wall 1x forming the melting chamber 10 of the furnace body 1 can be prevented. In other words, as understood from the structure shown in FIG. 2, the overlapping level of the overlapping portion 44 overlapped with each tip end portion 42a (corresponding to the tip end which is a portion of the combustion flame 41) of the hollow melting portions 42 is set to be higher than the overlapping level of the overlapping portion 44 overlapped with each base end portion 42c (corresponding to the base end portion of the combustion flame 41). It is noted here that the tip end portion 42a of the hollow melting portion 42 indicates one side of the hollow melting portion 42, from which the combustion burner 4 is positioned away. The base end portion 42c of the hollow melting portion 42 indicates the other side of the hollow melting portion 42, within which the combustion burner 4 is positioned.

The charging material 2 drops from the upper portion by the force of gravity onto the hollow melting portions 42, which have been formed by the melted charging material 2. The dropped charging material 2 is melted one by one at the hollow melting portions 42 and becomes a molten metal. Delay of flowing of the melted molten metal is prevented and flows down towards the molten metal discharge port 11 along the furnace floor surface 13 of the furnace body 1 and is discharged from the molten metal discharge port 11. Further the molten metal is reserved in a reservoir furnace (not shown) to be arranged at downstream side of the molten metal discharge port 11.

According to the embodiment, the molten metal discharge port 11 is arranged near the overlapping portion 44 formed by overlapping of each tip end portion 42a of the adjacently positioned hollow melting portions 42 to be in communication therewith. Upon melting of the charging material 2, by establishing communication between the plurality of hollow melting portions 42 and the molten metal discharge port 11, the melted charging material 2 (molten metal) easily flows towards the molten metal discharge port 11. This will prevent the delay flowing of the molten metal and accelerate the discharging speed of the molten metal thereby to efficiently melt the charging material 2.

When the charging material 2 is melted, the melted portion flows down along the furnace floor surface 13 of the furnace body 1 and towards the molten metal discharge port 11. Thus, the charging material 2 is promptly melted within a short period of time to become the molten metal. Thus, the consumption of the alloy component by oxidization can be prevented. Accordingly, the time the molten metal is exposed to the combustion gas becomes short and it is advantageous for the molten metal to maintain its quality. It is preferable for the melted portion formed by melting of the charging material 2 to be positioned directly above the furnace floor surface 13. The combustion gas exhausted from the combustion flame 41 rises together with the heat in the melting chamber 10. Therefore, the charging material 2 in the melting chamber 10 can be pre-heated in the preheating zone 12. As described above, since the melting of the charging material 2 is very fast, the dropping speed of the charging material 2 in the melting chamber 10 is accordingly fast, and consequently, the time the charging material 2 remains in the preheating zone 12 is short. Accordingly, the consumption of the charging material 2 in the pre-heating zone 12 of the melting chamber 10 by oxidization and the consumption of the alloy elements can be prevented.

According to the embodiment, the combustion flame 41 ejected from the combustion burner 4 is ejected in a direction away from the wall 1x defining the melting chamber 10 of the furnace body 1. Thus, an excess heating of the wall 1x can be prevented and any possible damage of the wall 1x by the heat can be prevented, either.

In accordance with the increase of generation of the molten metal, the charging material 2 in the melting chamber 10 decreases gradually. Accordingly, the air-tight open/close door 15d is opened and the charging pusher 15a advances by the driving of the driving source 15c and the charging material 2 is charged into the melting chamber 10 by the charging hopper 15b. The charging material 2 charged into the melting chamber 10 is pre-heated in the pre-heating zone 12 by the rising of the combustion gas by the combustion flame 41. The combustion gas is the gas generated by combustion of fuel by oxygen-oxidizing and does not include so much nitrogen gas which does not contribute to the combustion reaction. Thus, the heat efficiency becomes high.

According to the embodiment, as shown in FIG. 1, an oxygen injecting device 8 for ambient atmosphere adjustment having an oxygen tank 80 reserving the oxygen gas or the gas containing oxygen under high pressure condition is provided at the furnace body 1. A tip end portion 81a of a lead pipe 81 guided from the oxygen tank 80 enters into the melting chamber 10 penetrating through the wall 1x of the furnace body 1 and positioned near the combustion flame 41 of the combustion burner 4 in the vicinity of the overlapping portion 44 of the hollow melting portion 42. Accordingly, under the generation of the molten metal upon melting of the charging material 2, if the valve 82 is opened, the oxygen of the oxygen tank 80 is ejected from the tip end portion 81a of the lead pipe 81 to the molten metal. Thus, the component (such as, carbon, silicon, manganese, phosphorus or sulfur) contained in the molten metal can be oxidized and consumed. In this case, the adjustment of component ratio of the molten metal can be carried out. There may be high tensile steel which needs a high strengthening, having manganese containing a large amount, depending on the scrap. On the other hand, cast iron generally contains a low amount manganese. It should be noted that the valve 82 may be opened when necessary.

Second Embodiment

Figure 3:
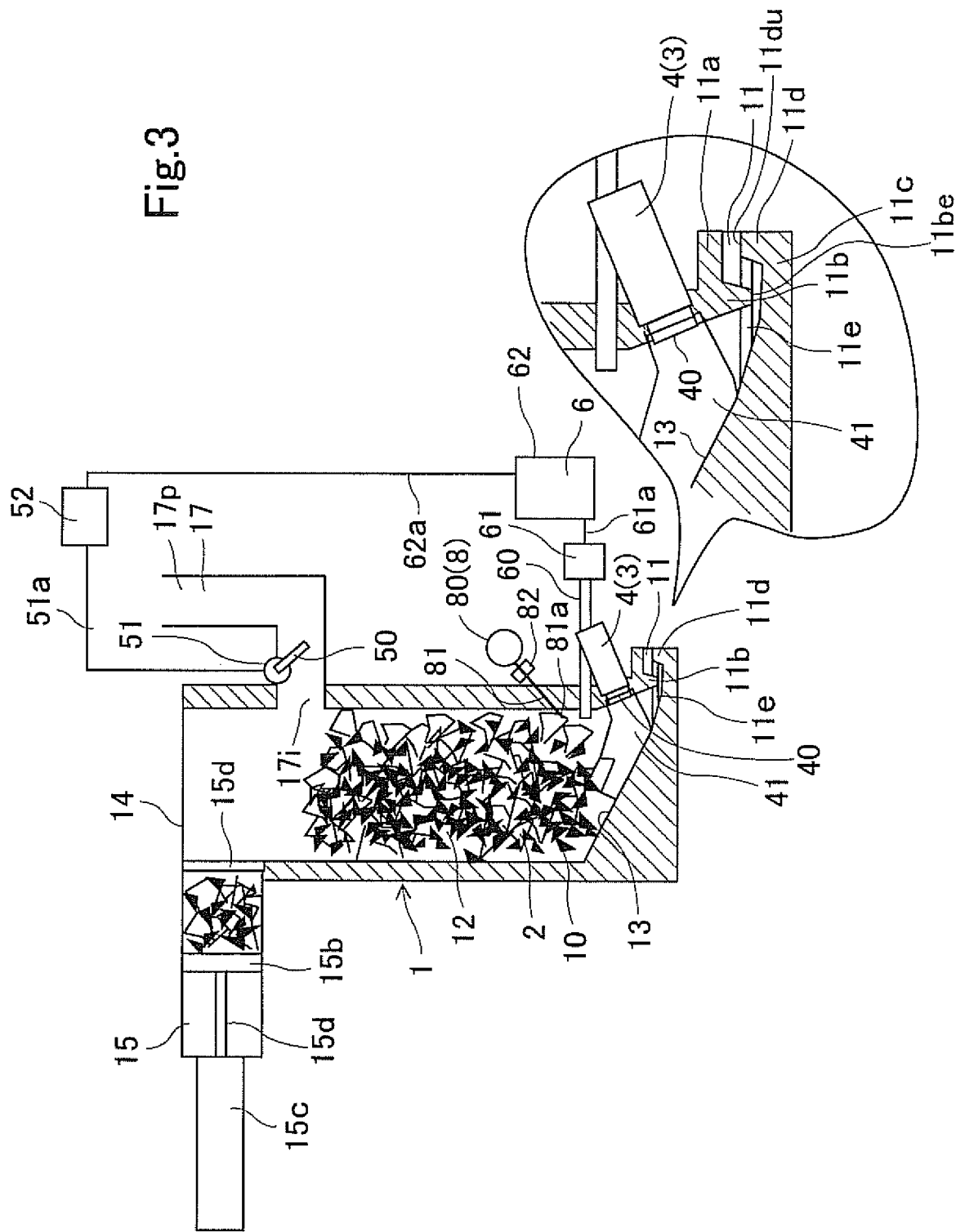
FIG. 3 is a view showing the structure of the gas cupola with the surrounding equipments according to a second embodiment of the invention.

FIG. 3 shows a second embodiment of the invention. This embodiment has basically the same structure, function and effects with those of the first embodiment. The molten metal discharge port 11 has an upper wall 11a, a lower wall 11c, a siphon partition wall 11b projecting from the upper wall 11a downwardly with respect to the molten metal discharge port 11, an outlet weir 11d projecting from the lower wall 11c upwardly and a siphon molten metal reserving space 11e. The molten metal discharge port 11 is formed with a siphon type outside air entrance preventing structure for preventing the outside air from entering into the melting chamber 10. An upper end 11du of the outlet weir 11d is positioned upwardly relative to a lower end 11be of the siphon partition wall 11b.

The molten metal is reserved in the siphon molten metal reserving space 11e and accordingly the air-tightness and sealability between the melting chamber 10 and the outside air can be improved. However, although in this type, the furnace pressure in the melting chamber 10 becomes negative level and the outside air might enter into the melting chamber 10. To solve the problem, an open/close door 50 for opening and closing the exhaust gas passage 17 and the open/close door 50 is closed to close the exhaust gas passage 17 to adjust the furnace pressure. Therefore, no ejector 70 is needed in this embodiment.

Third Embodiment

Figure 4:
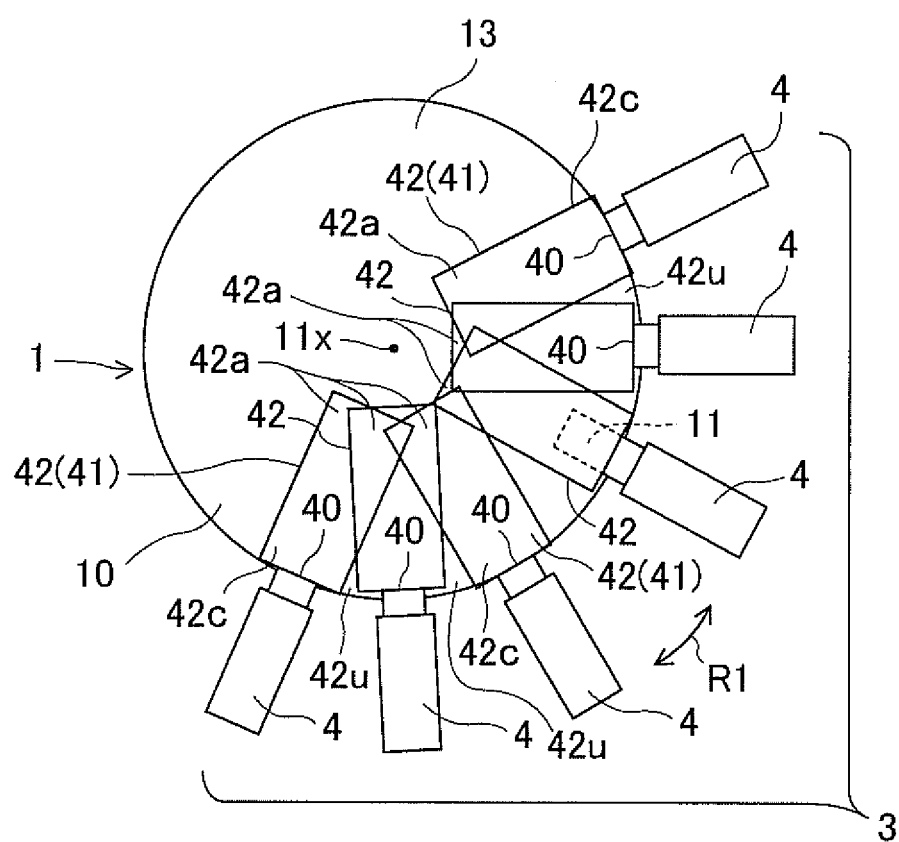
FIG. 4 is a cross sectional view taken along a horizontal direction and showing schematically the gas cupola according to a third embodiment of the invention.

FIG. 4 shows a third embodiment of the present invention. FIG. 4 is a cross sectional view of the furnace body 1 taken along a horizontal direction. As shown in FIG. 4, the plurality of combustion burners 4 forming a group 3 of combustion burners are arranged in a sector shape in a radial direction relative to the center line 11x of the melting chamber 10. The plurality of combustion burners 4 are arranged not in a full circle in a circumferential direction (direction indicated by arrow R1) centering on the center line 11x.

The combustion flame 41 ejected from the combustion burner 4 forms a hollow shaped, hollow melting portion 42 of which shape is cylindrical or similar to cylindrical at the charging material 2 of the melting chamber 10. The combustion burners 4 are arranged so that each tip end 42a of the mutually adjacently positioned two hollow melting portions 42 is overlapped with each other.

As the result, the plurality of hollow melting portions 42 and the molten metal discharge port 11 can be in communication with each other upon melting of the charging material 2. Accordingly, the molten metal of the charging material 2 melted in each hollow melting portion 42 easily flows towards the molten metal discharge port 11. Thus the retention or delay flowing of the molten metal can be prevented.

Further, since the furnace floor surface 13 is inclined downwardly towards the molten metal discharge port 11, the molten metal flows downwardly on the furnace floor surface 13 and discharged from the molten metal discharge port 11. Accordingly, the retention or delay flowing of the molten metal is further prevented thereby to melt the charging material 2 efficiently. It is noted that the features of the third embodiment can be combined with those of the first and second embodiments.

First Reference Embodiment

Figure 5:
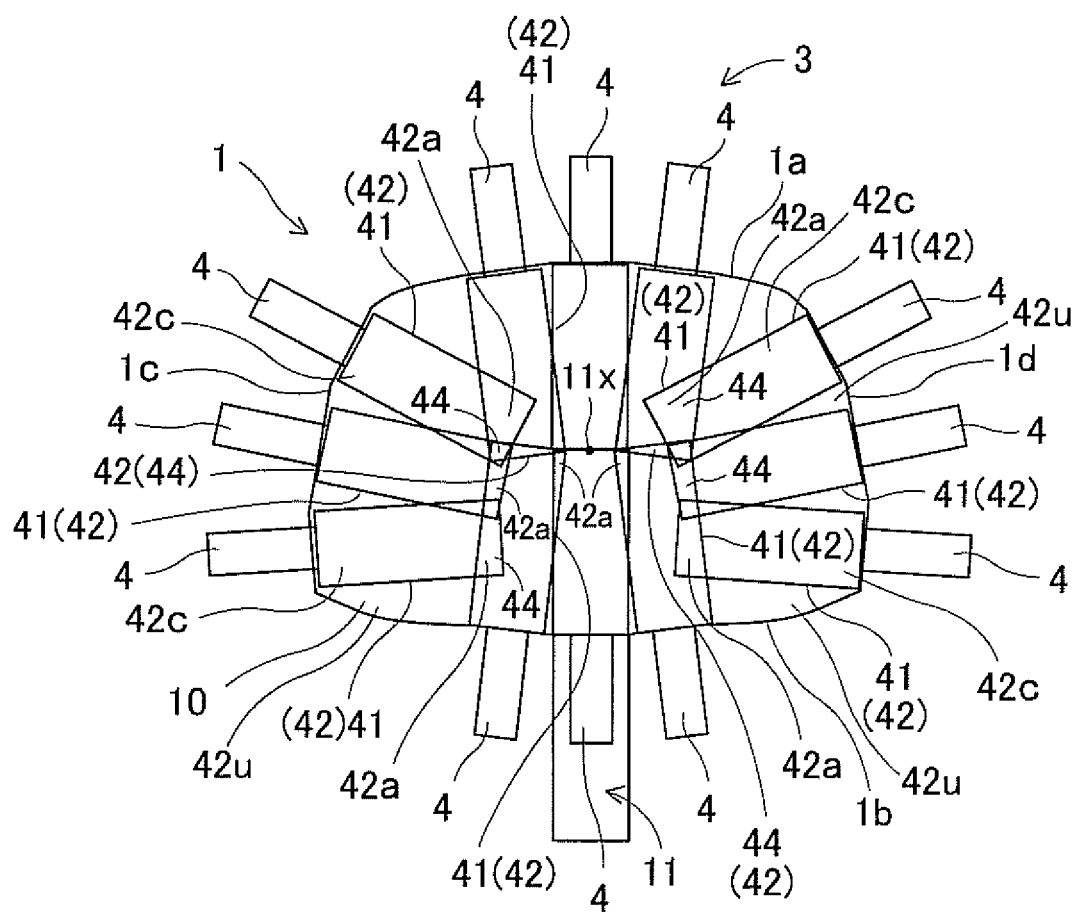
FIG. 5 is a cross sectional view taken along a horizontal direction and showing schematically the gas cupola according to a first reference embodiment of the invention.

FIG. 5 shows a first reference embodiment (the fourth embodiment is unused) of the invention. FIG. 5 shows a diagram of cross sectional view of the furnace body 1 taken along a horizontal direction. The furnace body 1 is of non-circular shape and the cross section of the furnace body 1 includes mutually opposed two elongated first sides 1a and 1b and mutually opposed two shortened second sides 1c and 1d. The shape in cross section is similar to trapezoidal shape. The first sides 1a and 1b are non-linear and are curved extending outwardly. The second sides 1c and 1d are non-linear and are also curved extending outwardly. As shown in FIG. 5, the plurality of combustion burners 4 forming the group 3 of the combustion burners are arranged to be extending towards the center line 11x of the melting chamber 10.

Similar to the other embodiments, the combustion flame 41 ejected from the combustion burner 4 melts the charging material 2 in the melting chamber 10 and generates the hollow shaped, hollow melting portions 42 at the charging material 2. In FIG. 5, the hollow melting portions 42 are schematically shown. The plurality of combustion burners 4 is arranged so that the plurality of hollow melting portions 42 (mutually adjacently positioned hollow melting portions 42) formed at each combustion burner 4 is overlapped to form an overlapping portion 44. Accordingly, upon melting of the charging material 2, each hollow melting portion 42 and the molten metal discharge port 11 establish fluid communication. Therefore, the charging material 2 (molten metal) melted at each hollow melting portion 42 easily flows towards the molten metal discharge port 11, thereby to efficiently melt the charging material 2.

Fifth Embodiment

Figure 6:
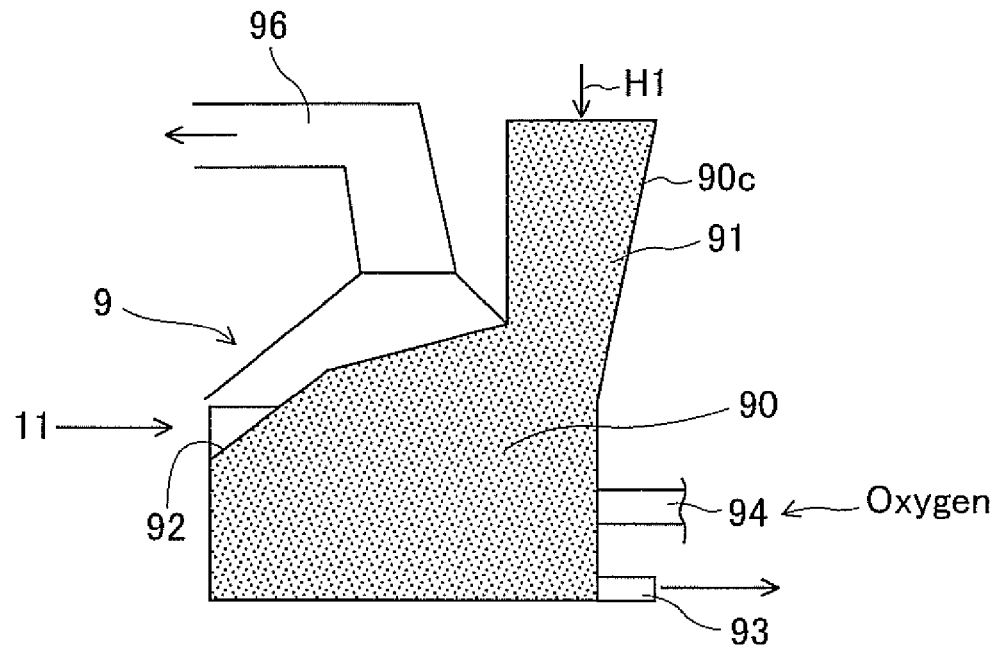
FIG. 6 is a cross sectional view of the carburization device showing schematically according to the fifth embodiment of the invention.

FIG. 6 shows a fifth embodiment of the invention. This embodiment has the structure and function and effects basically similar to those of the previous first to fourth embodiments. The carburization device 9 is provided at the molten metal discharge port 11 side. This carburization device 9 has a function of carburization of the molten metal discharged from the molten metal discharge port 11 and a function of increasing the temperature of the molten metal discharged from the molten metal discharge port 11.

The carburization device 9 is provided with a shell body 90c having a space forming a packed bed 90 filled with a carbon material, such as graphite and having molten metal permeability, a carbon material inputting port 91 forming the packed bed 90 by inputting the carbon material from an arrow H1 direction, a molten metal supplying port 92 for supplying the molten metal ejected from the molten metal discharge port 11 to the packed bed 90, a molten metal outlet port 93 for discharging the molten metal having passed through the packed bed 90 and an oxygen supplying port 94 for supplying oxygen gas or air for combustion to the inside of the packed bed 90.

Under carburization treatment, the oxygen gas or the air is supplied to the packed bed 90 from the oxygen supplying port 94 and the carbon material in the packed bed 90 is combusted, generating carbon dioxide and the temperature in the packed bed becomes high. The air may be used for combusting the carbon material, or oxygen gas may be used for combusting the carbon material in the packed bed 90. The molten metal melted in the melting chamber 10 of the furnace body 1 is supplied to the packed bed 90 from the molten metal supplying port 92 via the molten metal discharge port 11, adjusted by carburization, the temperature being regulated and then discharged from the molten metal outlet port 93. The carburization device 9 includes an exhaust gas port 96 which is in communication with the pre-heating zone 12 of the furnace body 1. The combusted exhaust gas generated in the carburization device 9 is a non-oxidized ambient gas or reducing atmosphere gas (gas including carbon monoxide CO) and flows through the exhaust gas port 96 and from the exhaust gas port 96, supplied to the pre-heating zone 12 of the furnace body 1.

The carbon material is consumed here and accordingly, the carbon material is supplied from the inputting port 91 as needed. The packed bed 90 is packed with the aggregation of the carbon material in the shape of particles, powders or fiber, etc., and accordingly the molten metal and the carbon material in the packed bed 90 are in contact with each other having a large contact area to improve the carburization efficiency relative to the molten metal. It is noted that the carburization device 9 according to the feature of this embodiment (fifth embodiment) can be combined with the features of other embodiments.

Sixth Embodiment

Figure 7:
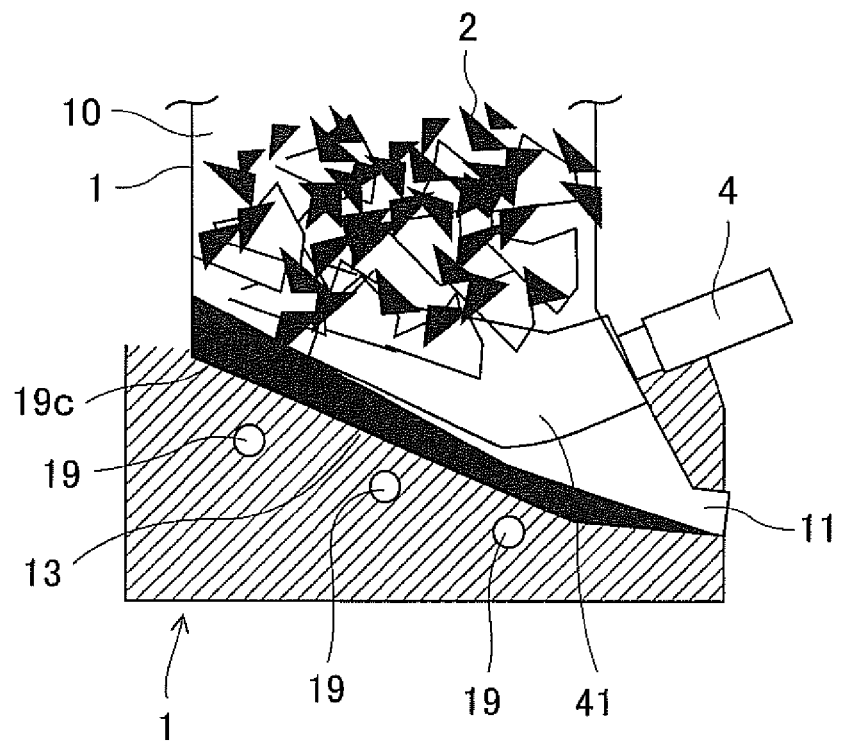
FIG. 7 is a view showing schematically the structure of gas cupola in the vicinity of the furnace floor surface according to the sixth embodiment of the invention.

FIG. 7 shows a sixth embodiment of the invention. This embodiment has the structure and the function and effect basically similar to those of the first embodiment. A plurality of cooling passages 19 is embedded in the lower portion of the furnace floor surface 13 formed at the bottom side of the furnace body 1 for cooling the furnace floor surface 13. The furnace floor surface 13 is inclined downwardly towards the molten metal discharge port 11. Refrigerant passes through the cooling passages 19. As the refrigerant, refrigeration liquid such as cooling water, cooling air or mist can be examplified. When the refrigerant flows through the cooling passages 19, the furnace floor surface 13 is refrigerated. As the result, a film shaped coagulation protective layer 19c formed by the coagulation of the molten metal is formed on the furnace floor surface 13 to cover and protect the furnace floor surface 13.

The coagulation protective layer 19c formed by coagulation of the molten metal protects the furnace floor surface 13 by covering thereof and the direct contact of the combustion flame 41 of the combustion burner 4 with the furnace floor surface 13 made of refractory material can be prevented and damages to the furnace floor surface 13 can be also prevented. Although not shown in the drawing, the cooling passages can be provided near the wall portion at the combustion burner 4 side of the furnace body 1 extending in a vertical direction for protecting the wall portion with the coagulation protective layer 19c by covering. It is noted that the cooling passages 19 and the coagulation protective layer 19c according to the feature of the sixth embodiment can be combined with the features of other embodiments.

FIRST TEST EXAMPLE

Using the gas cupola according to the second embodiment, the test was carried out. The furnace diameter of the furnace body 1 was 600 mm; the height thereof was 1800 mm; the number of used combustion burner 4 was six (6) arranged at the furnace body 1. The carbon combustion type carburization device 9 (volume of 100 Kg) as shown in FIG. 6 was installed at the molten metal discharge port 11. Shredder material made by steel scrap (0.05% of carbon and 0.8% of manganese by mass ratio) of about 100 mm×50 mm×6 mm in dimension was used. The shredder material was 96 mass parts and the ferrosilicon (1 mm to 3 mm, 75% of silicon by mass ratio) was 4 mass parts. The charging material 2 composed by mixing these two materials was charged up to the furnace top portion of the melting chamber 10. The angle θ1 (see FIG. 1) for attaching the combustion burners 4 was set to be 20 degrees. The total amount (13 A) of the combustion gas supplied to all combustion burners 4 was set to be 36 Nm³/h and the oxygen gas amount was set to be 72 Nm³/h. The fuel gas and the oxygen gas were evenly supplied to each combustion burner 4 and melting treatment was carried out. The oxygen ratio was set to be 0.81. It is noted here that the oxygen ratio is defined by the mass ratio of oxygen amount ($O_2$ equivalent) necessary for oxygen/complete combustion. If the oxygen ratio is 1, the fuel can be completely combusted.

According to the result of melting test under the oxygen ratio being 0.81, the melting capacity was 750 kg/h and the efficiency was ~54%. The efficiency is defined as the melting heat quantity/gas generating heat quantity. At the molten metal discharge port 11, the molten metal of temperature of 1430° C. and 0.05% carbon by mass ratio was obtained. To this result, the molten metal of temperature of 1500° C. and 3% carbon by mass ratio was obtained after the molten metal passed through the packed bed 90 of the carburization device 9. This is because the molten metal was temperature raised and carburization treated by the carburization device 9. This basic composition was 3% of carbon, 2.6% of silicon and 0.5% of manganese by mass ratio and can be used as the cast iron molten metal.

In the first test example, the reason why the oxygen ratio was set to be 0.81 is to reduce the amount of oxygen and to prevent the consumption of alloy component. Here, the consumption of iron was 0.7% by mass ratio. The consumption of silicon was 13% by mass ratio and the consumption of manganese was very large, equal to or more than 35% was consumed.

According to the gas cupola of the embodiments of the invention, even the scrap containing a high percent (0.8%) manganese is used, the manganese can be consumed by oxidization. Accordingly, the scrap such as high tensile steel containing excess manganese can be used as the charging material 2 by consuming the manganese. Therefore, it is advantageous to obtain a cast iron molten metal component which is not preferable to contain excess manganese.

SECOND TEST EXAMPLE

By using the gas cupola according to the second embodiment, the test was conducted similar to the case of test example 1. Only the return material (3.75% of carbon, 2.6% of silicon and 0.23% of manganese by mass ratio) of the spherical graphite cast iron was charged in the melting chamber 10 up to the furnace top thereof. A plural number of (6) combustion burner 4 was installed in the furnace body 1. The angle θ1 (see FIG. 1) for attaching the combustion burners 4 was set to be 20 degree. The oxygen combustion type carburization device 9 (volume of 100 Kg) shown in FIG. 6 was removed from the furnace body 1 at the molten metal discharge port 11. As the molten metal discharge port 11, a siphon type was adopted and the communication with the outside air was interrupted.

Figure 8:
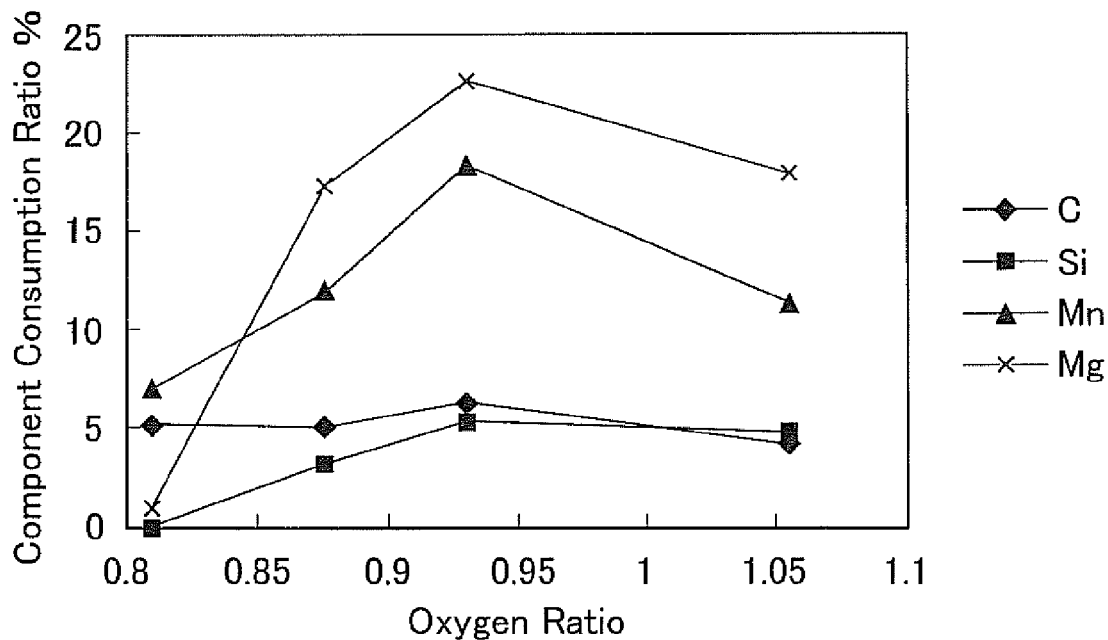
FIG. 8 is a graph associated with the test example 2.

FIG. 8 shows the test result. The horizontal axis of the graph in FIG. 8 indicates the oxygen ratio and the vertical axis indicates component consuming ratio (mass ratio) regarding the elements, carbon (C), silicon (Si), manganese (Mn) and magnesium (Mg). As shown in FIG. 8, when the oxygen ratio is varied from 0.81 to 1.05, the consuming ratio of each component does not increase flatly. In other words, during the oxygen ratio between 0.81 and 0.93, the consuming ratio of each component increases and when the oxygen ratio exceeds 0.93, the consuming ratio of each component decreases.

According to the melting test result, the oxygen ratio was set to be 0.81, the melting capacity was 750 Kg/h and efficiency was ~54%. The melting temperature at the molten metal discharge port 11 was 1250° C. In this test example, burn-through temperature equals to the tapping temperature. Here, the oxygen ratio at the combustion flame 41 increases and then the melting capacity (capacity of generating molten metal) increases. In this case, the oxygen ratio was 1.05, the melting capacity was 866 Kg/h and the efficiency was ~62%. However, even the oxygen density in the combustion gas increases due to the increase of the melting capacity (capacity of generating molten metal) in the combustion flame 41, the consuming ratio of the component of the charging material decreases because of the decrease of the retention time of the charging material in the melting chamber 10.

Figure 9:
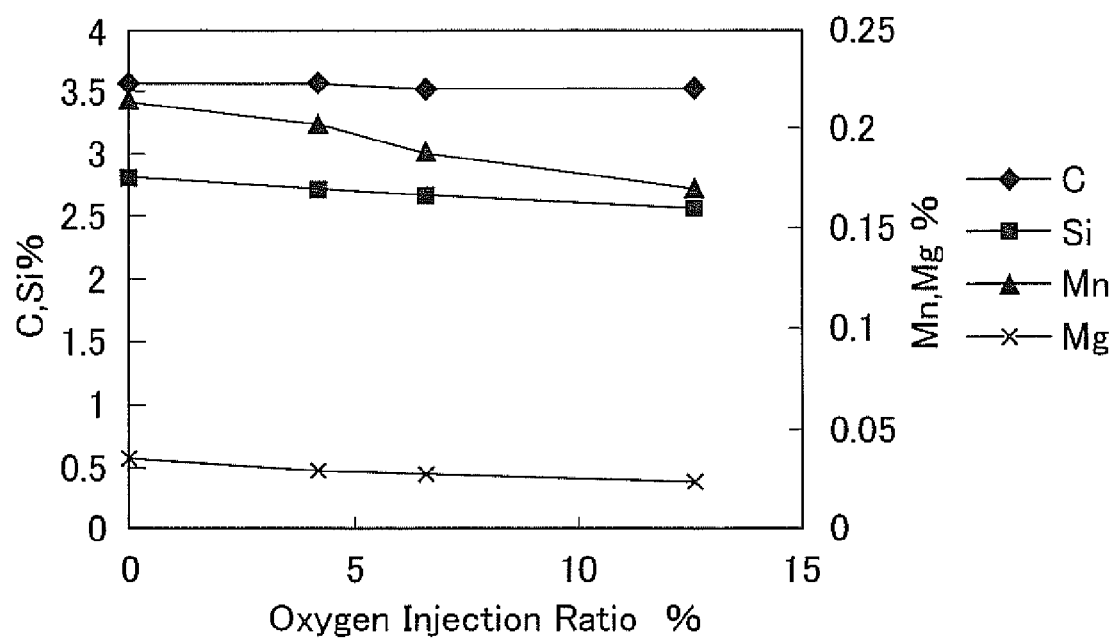
FIG. 9 is a graph associated with the test example 2.

In order to efficiently increase the consumption of each component, oxygen was injected without increasing the oxygen ratio. In FIG. 9, the horizontal axis indicates oxygen injection ratio (%) and the vertical axis indicates component consuming ratio (mass ratio) regarding the elements, carbon (C), silicon (Si), manganese (Mn) and magnesium (Mg). It is noted here that the oxygen injection ratio (%) is defined as injected oxygen amount relative to the entire combustion gas amount. FIG. 9 indicates the test result of the case where the oxygen was injected from the lead pipe 81 of the oxygen injecting device 8 of the furnace body 1 into the melting chamber 10. In the case that the oxygen is injected into the melting chamber 10 from the oxygen injecting device 8 of the furnace body 1, as shown in FIG. 9, it is understood that when the oxygen injecting ratio (%) increases, the component containing amount (mass by %) of, such as, carbon (C), silicon (Si), manganese (Mn) and magnesium (Mg) contained in the molten metal decreases and the component consuming ratio by oxygen increases. The magnesium (Mg) with low boiling point remains with a relatively high containing amount and this indicates the high speed melting which is the melting feature of the present invention. In other words, since the melting speed is high, transpiration of the magnesium can be prevented and the containing amount of magnesium is large.

Others

The structure of the furnace body is not limited to the above embodiments. In FIG. 1, the combustion burners 4 are arranged with inclination angle θ1 relative to the imaginary horizontal line W so that the combustion burners 4 face downward. The structure is not limited to this and the combustion burners 4 may be arranged along the imaginary horizontal line W. The invention is not limited to the description above and the embodiments shown in the attached drawings and may be changed or altered within the scope of the subject matter of the invention.

Applicable Industry

This invention can be utilized for a gas cupola for melting of cast iron, such as, flake graphite cast iron, spherical graphite cast iron, or vermicular graphite cast Iron.

The invention claimed is:

1. A gas cupola for melting metal, the gas cupola comprising:
   a furnace body having a non-circular shape, as viewed in cross section taken along a horizontal direction of the furnace body;
   a melting chamber, in the furnace body, to melt a metal-based charging material;
   a molten metal discharge port to discharge a molten metal formed by the metal-based charging material melted in the melting chamber; and
   a plurality of combustion burners, provided in the furnace body, to each eject, by burning a fuel, a combustion flame to melt the metal-based charging material in the melting chamber, wherein,
   in a cross section of the furnace body, taken along a horizontal direction, each of the combustion flames ejected from each of the plurality of combustion burners forms a hollow-shaped melting portion to melt the metal-based charging material in the melting chamber,
   wherein, the plurality of combustion burners are arranged in a circumferential direction centering on a center line of the melting chamber, so that adjacent ones of the plurality of hollow-shaped melting portions are overlapped with each other along the circumferential direction, and wherein,
   upon the melting of the metal-based charging material, each hollow-shaped melting portion communicates with the molten metal discharge port.

2. A gas cupola for melting metal, the gas cupola comprising:
   a furnace body having a melting chamber to melt a metal-based charging material;
   a molten metal discharge port to discharge a molten metal formed by the metal-based charging material melted in the melting chamber;
   an exhaust gas passage to discharge combustion gas from the melting chamber to the outside air;
   a door to open or close the exhaust gas passage;
   a driving portion to open or close the door; and
   a plurality of combustion burners, provided in the furnace body, to each eject, by burning a fuel, a combustion flame to melt the metal-based charging material in the melting chamber, wherein,
   in a cross section of the furnace body, taken along a horizontal direction, each of the combustion flames ejected from each of the plurality of combustion burners forms a hollow-shaped melting portion to melt the metal-based charging material in the melting chamber,
   wherein, the plurality of combustion burners are arranged in a circumferential direction centering on a center line of the melting chamber, so that adjacent ones of the plurality of hollow-shaped melting portions are overlapped with each other along the circumferential direction, and wherein,
   upon the melting of the metal-based charging material, each hollow-shaped melting portion communicates with the molten metal discharge port.

3. A gas cupola for melting metal, the gas cupola comprising:
   a furnace body having a melting chamber to melt a metal-based charging material;
   a molten metal discharge port, to discharge a molten metal formed by the metal-based charging material melted in the melting chamber;
   a plurality of combustion burners, provided in the furnace body, to each eject, by burning a fuel, a combustion flame to melt the metal-based charging material in the melting chamber; and
   a carburization device, arranged at a side of the furnace body having the molten metal discharge port, to carburize the molten metal and increase a temperature of the molten metal discharged from the molten metal discharge port, wherein,
   in a cross section of the furnace body, taken along a horizontal direction, each of the combustion flames ejected from each of the plurality of combustion burners forms a hollow-shaped melting portion to melt the metal-based charging material in the melting chamber,
   wherein, the plurality of combustion burners are arranged in a circumferential direction centering on a center line of the melting chamber, so that adjacent ones of the plurality of hollow-shaped melting portions are overlapped with each other along the circumferential direction, and wherein,
   upon the melting of the metal-based charging material, each hollow-shaped melting portion communicates with the molten metal discharge port.

* * * * *